June 13, 1950 — D. E. CANCELLI ET AL — 2,511,460
REMOVABLE RIGID TOP FOR CAR BODIES Filed Nov. 7, 1947 — 2 Sheets-Sheet 1

INVENTOR.
DANTE E. CANCELLI
BRUNO P. SILVESTRI
BY
*McMorrow, Berman + Davidson*
Attorneys

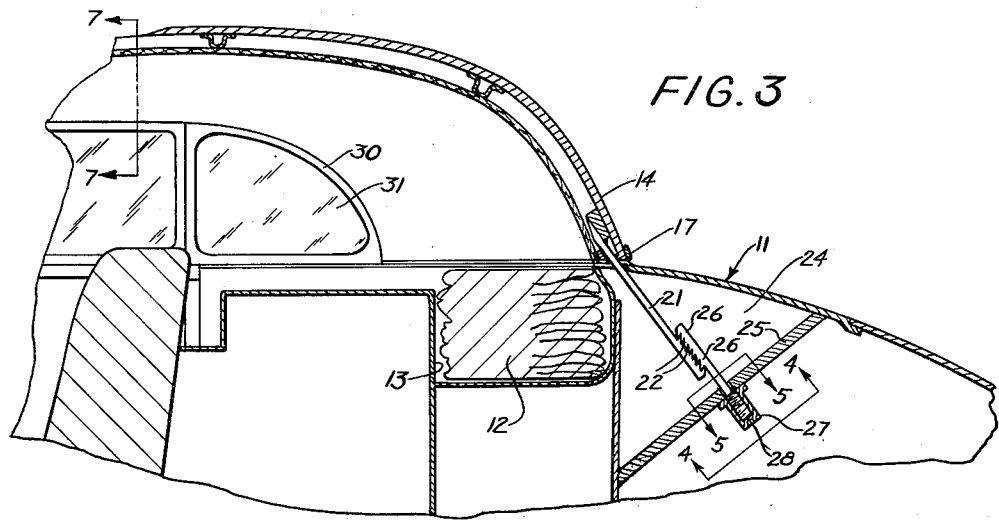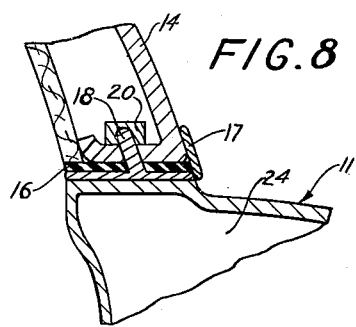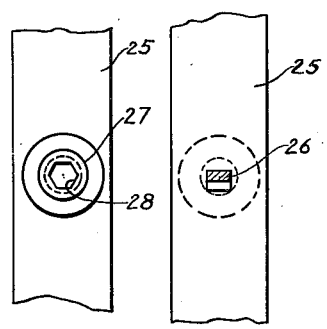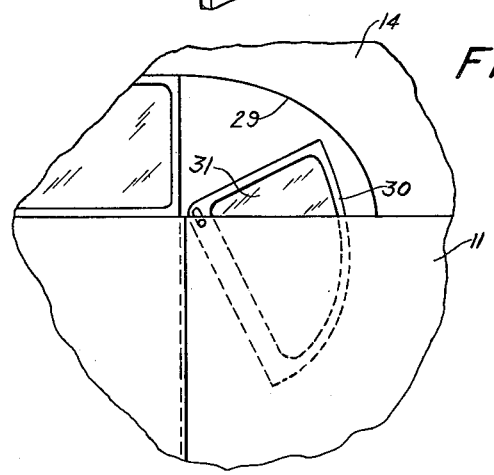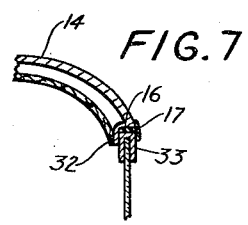

Patented June 13, 1950

2,511,460

UNITED STATES PATENT OFFICE 2,511,460

REMOVABLE RIGID TOP FOR CAR BODIES

Dante E. Cancelli and Bruno P. Silvestri,
Peckville, Pa.

Application November 7, 1947, Serial No. 784,572

4 Claims. (Cl. 296—102)

1

This invention relates to body structure for motor vehicles, and more particularly to a removable rigid top for motor vehicles of the "convertible" type.

A main object of the invention is to provide a rigid top which may be readily mounted on a motor vehicle of the "convertible" type whenever desired, said top being very simple in construction, light in weight, and easy to mount in position on the vehicle.

A further object of the invention is to provide a novel and improved removable rigid top member for motor vehicles of the "convertible" type, said top member being inexpensive to manufacture, neat in appearance, rugged in construction requiring only a few fastening connections to secure it in position on a motor vehicle, and serving to replace the normal flexible canvas top of the vehicle when the normal top is out of use.

Further objects and advantages of the invention will become apparent from the following description and claims, and from the accompanying drawings, wherein:

Figure 3 is a longitudinal cross-sectional detail view taken on line 3—3 of Figure 2 showing the top member of Figure 1 installed in operative position on the vehicle body.

Figure 4 is an enlarged detail view taken on line 4—4 of Figure 3.

Figure 5 is an enlarged cross-sectional view taken on line 5—5 of Figure 3.

Figure 6 is a fragmentary side elevational view of the vehicle body showing the cooperative relation between a rear lower edge portion of the top member of Figure 1 and a pivoted rear window of the vehicle.

Figure 7 is a fragmentary detail cross-sectional view taken on line 7—7 of Figure 3, showing the interfitting relation between a side edge of the top member and the top of a side window frame of the vehicle.

Figure 8 is an enlarged longitudinal cross-sectional detail view taken through a rear edge portion of the top member of Figure 1 when mounted on the vehicle body and showing the interlock-

Figure 1:
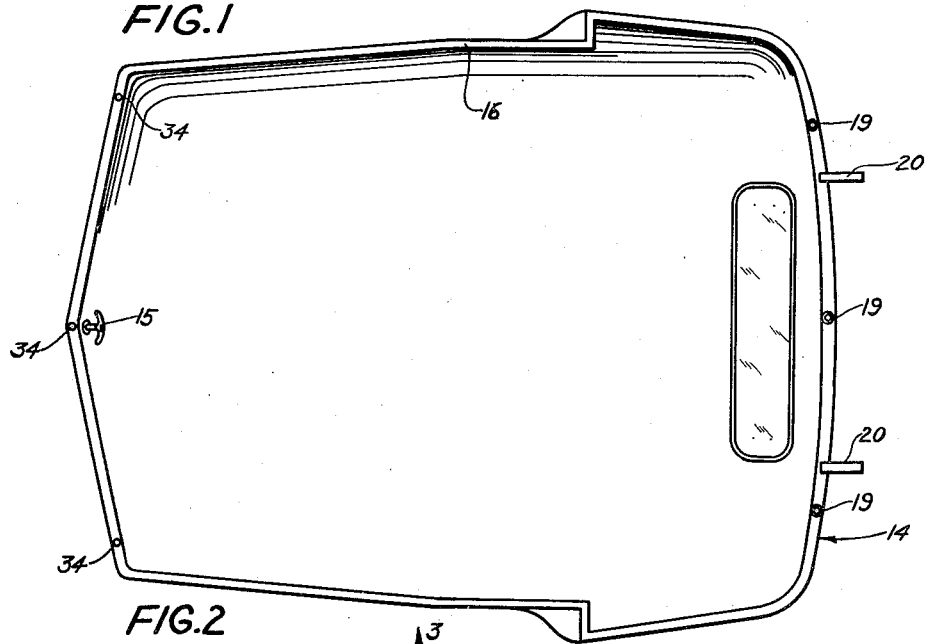
Figure 1 is a bottom plan view of a rigid top member constructed in accordance with the present invention.
Figure 2:
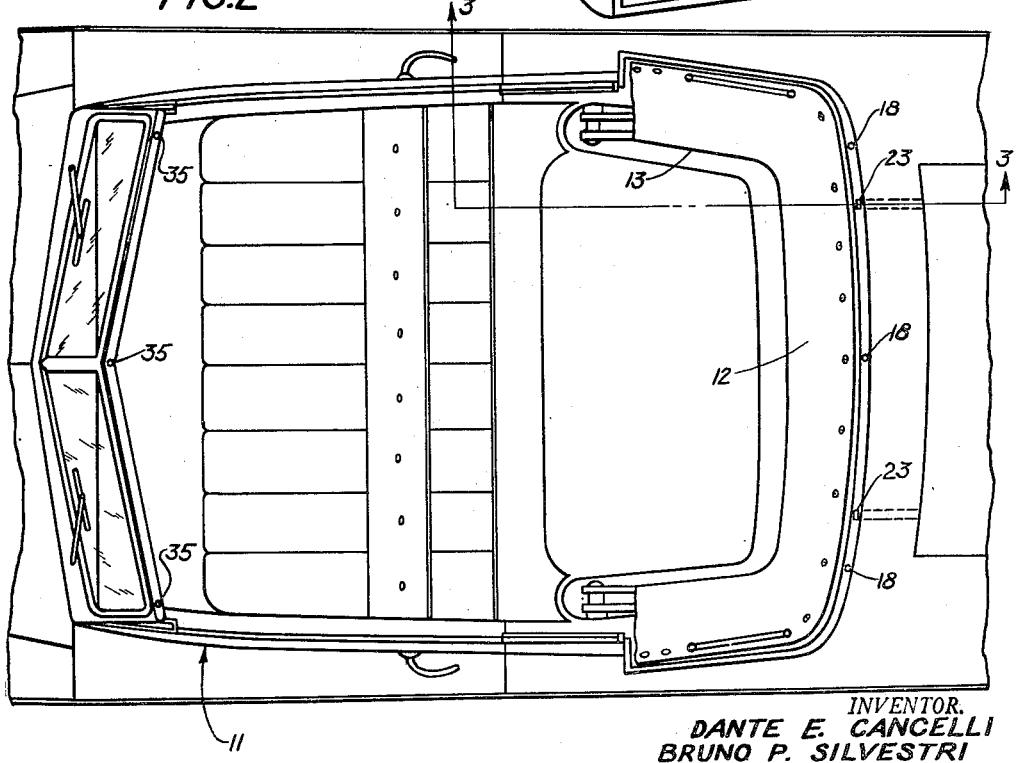
Figure 2 is a top plan view of the intermediate portion of a motor vehicle of the "convertible" type with the original flexible top thereof in inoperative stored position, the vehicle body being adapted to receive the rigid top member of Figure 1 in place of said original flexible top.

2 ing relation of a positioning lug carried by the vehicle with said rear edge portion.

It is desirable to replace the flexible canvas top of a motor vehicle of the "convertible" type at certain seasons of the year, as for example, during the winter months, with a rigid top of suitable weather-resistant material such as steel or aluminum. Heretofore no provision has been made for this, and it is therefore a prime purpose of the present invention to provide such a rigid top, which may be quickly installed on the vehicle when the original top is folded up in its storage compartment.

Referring to the drawings, 11 designates a conventional motor vehicle body of the "convertible" type. The original canvas top of the vehicle is shown at 12, folded up in its storage compartment 13. Designated at 14 is a substitute top of hollow metal construction which is adapted to fit over the vehicle body in place of the original canvas top. The front end of the rigid top 14 is provided with a conventional hook clamp 15 adapted to be lockingly engaged with the existing catch element on the vehicle employed to releasably fasten the canvas top in operative position.

As shown in Figures 7 and 8, the bottom edges of the hollow rigid top 14 have secured thereto a continuous rubber sealing strip 16 adapted to bear on the top edges of the window frames and other portions of the vehicle body with which the bottom edge portions of the rigid top come into contact when said top is installed on the vehicle to provide a weatherproof seal. Also secured to the marginal edge portions of the rigid top 14 around its periphery is a depending outer guard strip 17 which may be chromium plated or otherwise suitably coated to provide a neat appearance at the joint between the rigid top and the vehicle body.

The rear top edge of the passenger compartment of the vehicle is provided with a plurality of forwardly inclined upstanding lugs 18 which are received in openings 19 at the rear edge of the rigid top 14. Fastened in the rear bottom wall portion of the hollow top 14 are recessed receptor blocks 20 adapted to receive the respective lugs 18 when the rigid top is installed on the vehicle.

Secured rigidly to the rear portion of top 14 are a pair of downwardly and rearwardly extending rod members 21, 21 formed with upwardly facing ratchet teeth at their rear end portions. The rear top edge of the vehicle passenger compartment is apertured at 23, 23 to allow said rod members to extend therethrough into the trunk compartment 24. The trunk compartment is provided with bracket portions 25, and extending through suitable apertures in said bracket portions are rod members 26 formed with downwardly facing ratchet teeth adapted to interlock with the ratchet teeth 22 of the rod members 21. Threaded on the ends of the rod members 26 are cup-like nuts 27 formed at their ends with hexagonal recesses 28 adapted to receive the end of a suitable hexagonal tightening tool, whereby the rod members 26 may be drawn tightly with respect to the rod members 21 to lock the rear portion of rigid top 14 in position on the vehicle.

As shown in Figure 6, the bottom edges of the top member 14 are suitably curved, as shown at 29, to fit the curved top edges 30 of the pivoted rear windows 31 of the vehicle body. The curvature of the bottom edges at 29 also provides free swinging clearance for the movement of the pivoted windows 31 to and from their raised positions.

The side edges of the top member 14 are flanged downwardly at their inner portions, as shown at 32, in Figure 7, to provide a shouldered inside fit between said side edges and the top portions of the vehicle window frames, indicated at 33. As previously stated, the finishing strip 17 overlies the outer portions of the joints between the window frame top elements and the edges of the rigid top 14.

The front edge of the rigid top 14 is formed with recesses 34 adapted to receive pins 35 projecting upwardly from the top of the windshield frame of the vehicle, said pins 35 cooperating with said recesses to insure proper registration of the front end of the rigid top 14 with the front end of the vehicle passenger compartment.

The inside of the rigid top 14 is preferably lined with upholstery fabric to match the upholstery of the vehicle.

While a specific embodiment of a detachable rigid top structure for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle of the convertible type, a detachable rigid top adapted to fit on the top edges of the passenger compartment when the original flexible top is in dismantled condition, deformable strip means carried by the bottom edges of said top and adapted to sealingly engage the top edges of the passenger compartment, interlocking guide means on the bottom edges of said top and on the top edges of said compartment insuring registration of said top with the compartment, front hold-down means for securing the forward portion of said top to the vehicle, and rear hold-down means carried by the top and extending into the rear trunk compartment of the vehicle, means in the rear trunk compartment projecting toward the extending end of the rear hold-down means and inter-locking with the latter, and means interengaging with the last-named means for fixedly securing the latter.

2. In a motor vehicle of the convertible type, a detachable rigid top adapted to fit on the top edges of the passenger compartment when the original flexible top is in dismantled condition, interlocking guide means on the bottom edges of said top and on the top edges of said compartment insuring registration of said top with the compartment, front hold-down means for securing the forward portion of said top to the vehicle, and rear hold-down means carried by the top and extending into the rear trunk compartment of the vehicle, and means in the rear trunk compartment projecting toward the extending end of the rear hold-down means and inter-locking with the latter.

3. In a motor vehicle of the convertible type, a detachable rigid top adapted to fit on the top edges of the passenger compartment when the original flexible top is in dismantled condition, interlocking guide means on the bottom edges of said top and on the top edges of said compartment insuring registration of said top with the compartment, front hold-down means for securing the forward portion of said top to the vehicle, downwardly projecting means carried by said top and extending into the rear trunk compartment of the vehicle, and manually operable means in said rear trunk compartment adapted to interlock with said downwardly projecting means for securing the rear portion of the top to the vehicle.

4. A detachable top for motor vehicles comprising a concave hollow body of rigid material adapted to fit on the top edges of the passenger compartment of an open vehicle body, and a plurality of rod members carried by the rear edge portion of said top and projecting downwardly and rearwardly therefrom, the ends of said rod members being formed with upwardly facing ratchet teeth, and additional rod members having complementarily formed teeth engageable with the teeth of said first-mentioned rod members, including means for adjustably tensioning said additional rod means so as to exert tension on said first rod means for securely holding said top on said vehicle body.

DANTE E. CANCELLI.
BRUNO P. SILVESTRI.

REFERENCES CITED

The following references are of record in the file of this patent:

UNITED STATES PATENTS

| Number | Name | Date |
|---|---|---|
| 435,736 | Divine | Sept. 2, 1890 |
| 702,520 | Winterowd | June 17, 1902 |
| 1,778,356 | Coppock | Oct. 14, 1930 |
| 2,118,520 | Pendleton | May 24, 1938 |

FOREIGN PATENTS

| Number | Country | Date |
|---|---|---|
| 231,307 | Great Britain | Apr. 2, 1925 |
| 263,673 | Great Britain | Jan. 6, 1927 |